Figure 1:
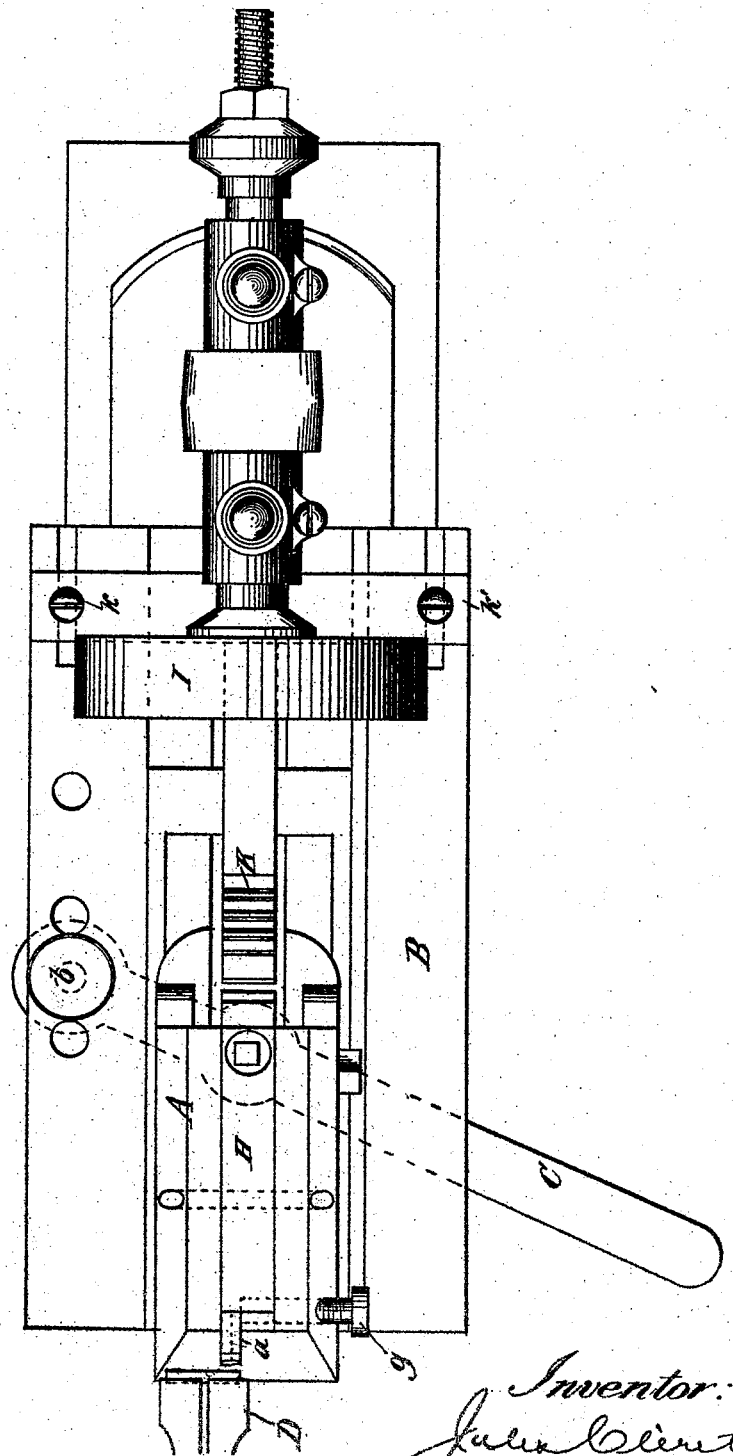

(No Model.) 2 Sheets—Sheet 1.
J. CLÉRET.
MECHANISM FOR TURNING PEARL BUTTONS OR OTHER ARTICLES.
No. 501,922. Patented July 25, 1893.

Attest:
Arthur H. Orb.
Rene Lewis.

Inventor:
Jules Cléret
by Pollak & Mauro
his attorneys.

(No Model.) 2 Sheets—Sheet 2.
J. CLÈRET.
MECHANISM FOR TURNING PEARL BUTTONS OR OTHER ARTICLES.
No. 501,922. Patented July 25, 1893.
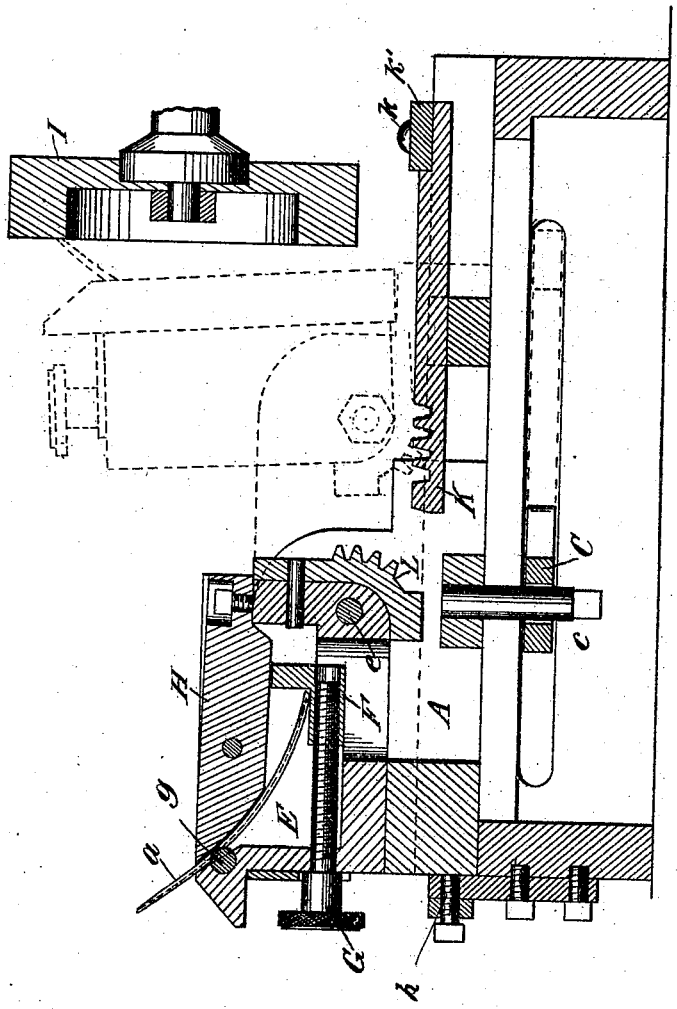

UNITED STATES PATENT OFFICE.

JULES CLÈRET, OF PHILADELPHIA, PENNSYLVANIA, ASSIGNOR TO THE J. CLÈRET PEARL BUTTON MANUFACTURING COMPANY, OF SAME PLACE.

MECHANISM FOR TURNING PEARL BUTTONS OR OTHER ARTICLES.

SPECIFICATION forming part of Letters Patent No. 501,922, dated July 25, 1893.

Application filed September 30, 1892. Serial No. 447,408. (No model.)

*To all whom it may concern:*

Be it known that I, JULES CLÈRET, a citizen of the Republic of France, and a resident of Philadelphia, Pennsylvania, have invented a new and useful Improvement in Mechanism for Turning Pearl Buttons or other Articles, which is fully set forth in the following specification.

This invention has reference to the construction of tools and machinery for cutting or turning pearl buttons, though, of course, it is not limited to such use.

In turning pearl buttons the tools have to act upon a very hard and brittle material, and therefore are rapidly worn away by the frequent sharpening that is necessary in order to maintain a cutting edge. These tools are ordinarily made of long thin bars of steel channeled or grooved along one face, so that a cross-section of the tool presents on one edge the contour of the finished button. Tools made in this way can be used so long as enough of the stock remains to enable it to be secured in the holder. In Letters-Patent No. 450,457, granted to me April 7, 1891, will be found a description of a pearl button machine in which a tool of this character is used.

In making these tools it is difficult to cut the channels or grooves in a long flat bar of steel, and to perform the other operations of dressing and polishing. According to the present invention these operations are rendered much more simple and easy by forming the stock of the tool in a ring which can be mounted on a circular rotating holder and readily cut and shaped to the desired pattern. When completed, the circular stock is cut into sections of convenient length, and one end ground off to form the cutting edge. These curved tools have certain advantages in use over straight tools. For example, when held obliquely to the plane of rotation of the button blank, the curved tool offers greater resistance to the work, and cuts to better advantage than the straight tool. Moreover, it occupies less space lengthwise and can be more conveniently held and adjusted in its holder.

As described in my former patent the sharpening wheel or device was movable into and out of contact with the cutting end of the tool and the button chuck was supported on a movable carriage. According to the present invention the tool holder is carried by a slide, and the workman moves the slide forward to cut the button and then withdraws it. The machine is so constructed that a further motion backward will cause the tool holder to rotate until the end of the tool is brought into contact with the grinder. Thus by a simple reciprocating movement the tool may be brought into contact with either the work at one end of its travel or the grinder at the other end, and a single operating handle gives all the necessary movements.

In order that the invention may be fully understood I will now describe the same in detail with the aid of the accompanying drawings which illustrate one embodiment of the invention.

Figure I, is a plan view of a machine adapted specially for the turning of pearl buttons, and Fig. II is a longitudinal vertical section, omitting immaterial portions of the arbor and supports of the grindstone.

The cutting tool $a$ conforms throughout to the arc of a circle, having the grooves, ribs, channels, (or other configurations, which are to give shape to the button,) on the outer rim or face, and extending from end to end of the tool. The latter is a section of a ring, as already stated, which after having been cut to proper shape, dressed and polished, is divided radially into sections of convenient length.

A represents the tool carriage adapted to slide in suitable ways of the base plate B, being provided with an operating handle or lever C, pivoted at $b$ to the base plate, and engaging by a slot with a pin $c$ on the tool carriage or slide. By means of this handle the operator moves the tool carriage toward and away from the work holding chuck D, which may be of any ordinary construction.

The tool-holder E comprises a chambered block swiveled at $e$ to the carriage. In the chamber of this block is a supporting plate F having an upturned flange against which rests the lower edge of the tool $a$. Plate F can be moved horizontally by an adjusting screw G to regulate the position of the cutting tool. The latter is clamped in operation by a set screw $g$, and further protected by a block H which is secured in place by suitable means which permit of its ready removal. In operation, the work being rotated in chuck D moves, at the point where the tool acts, in a downward direction, and its plane of rotation is tangential to the arc of the tool. The latter therefore offers the greatest possible resistance to the work and cuts to the best advantage.

The sharpening stone or grinder I is, as shown, supported directly in line with the chuck and tool carriage. At the rear of the latter is a rack K adapted to engage with the segment of a pinion L, on the tool-holder E. So long as the tool is cutting properly the workman moves the carriage forward until arrested by the adjustable stop $h$ and backward until the pinion L strikes the rack K. To sharpen the tool, the lever C is moved still farther to the right, bringing rack K and pinion L into engagement, so that as the tool slide approaches the grinding wheel I, tool-holder E turns on its pivot $e$ until the end of the tool $a$ is brought into contact with the grinder and the sharpening effected. By this arrangement, the grinder being relatively stationary, the workman does not have to release his operating lever and manipulate a movable grinder to sharpen the tool. Moreover, the mechanism as a whole, besides being more effective, is simpler, more compact, and more easily constructed than those heretofore designed for doing the same work. Preferably the relative positions of the tool-holder and grinder are such that the latter grinds or sharpens the tool in a plane intersecting the outer face of the tool at an acute angle.

The rack K is supported by a cross bar $k'$ the latter being adjustably fastened to the base plate by screws $k$, so that the rack can be adjusted lengthwise to regulate the angle at which the grinder acts with reference to the face of the cutting tool.

The constructions and dispositions of the several parts of the machine herein described, and shown in the accompanying drawings, present what is deemed the best embodiment of the principle of the invention; but it will be obvious that these forms and arrangements admit of much modification, and that parts of the invention may be used without others.

Having now fully described my invention, what I claim is—

1. In a machine for turning buttons or other articles, the combination with a work-holding chuck, of a tool-holder movable toward and away from said chuck, and a curved tool having its outer face shaped to give the desired contour to the work, and supported in said holder so that in operation the plane of rotation of the work is approximately tangential to the curve of the tool, substantially as described.

2. The combination with the work-holding chuck, of a curved tool, and a holder comprising a chambered support, a plate against which the inner end of the tool rests, means for adjusting said plate in a right line, and means for clamping the tool in its operative position, substantially as described.

3. In a turning machine, provided with a chuck, and a relatively stationary sharpener the combination of a tool carriage adapted to slide toward the chuck in one direction, and toward the sharpener in the other, and a tool-holder pivoted on said carriage and capable of rotation to bring the tool into contact with the grinder, substantially as described.

4. In a turning machine, provided with a sharpener, and a work-holding chuck, the combination of a tool-carriage, and a tool-holder pivoted in said carriage and movable on its pivot to bring the tool in one position into operative relation to said chuck, and in the other into contact with said sharpener, substantially as described.

5. The combination of a movable tool carriage, a relatively stationary sharpener, a tool-holder pivoted on said carriage, and gearing coming into engagement as said carriage approaches said sharpener and rotating said holder on its pivot, thereby bringing the cutting edge of said tool into contact with the sharpener substantially as described.

6. In a turning machine provided with a work-holding chuck, and a relatively stationary sharpener, the combination of a carriage adapted to reciprocate in a path between the two, a tool-holder pivoted on said carriage, and means (such as a rack and pinion) for turning said holder on its pivot so as to present the end of the tool to the latter, substantially as described.

In testimony whereof I have signed this specification in the presence of two subscribing witnesses.

JULES CLÈRET.

Witnesses:
  E. L. BUCHEY,
  ALFRED JONHEIMER.